(12) United States Patent
Askins et al.

(10) Patent No.: US 11,431,287 B2
(45) Date of Patent: Aug. 30, 2022

(54) TRACKING DEVICE

(71) Applicant: SOLAR AVANCES Y SISTEMAS DE ENERGÍA, S.L., Alicante (ES)

(72) Inventors: Stephen Alexander Askins, Madrid (ES); Jaime Caselles Fornés, Pedreguer (ES); Ignacio Antón Hernández, Madrid (ES); Marta Victoria Pérez, Murcia (ES)

(73) Assignee: SOLAR AVANCES Y SISTEMAS DE ENERGIA, S.L., Alicante (ES)

( * ) Notice: Subject to any disclaimer, the term of this patent is extended or adjusted under 35 U.S.C. 154(b) by 134 days.

(21) Appl. No.: 17/047,168

(22) PCT Filed: Apr. 13, 2018

(86) PCT No.: PCT/ES2018/070303
§ 371 (c)(1),
(2) Date: Oct. 13, 2020

(87) PCT Pub. No.: WO2019/197689
PCT Pub. Date: Oct. 17, 2019

(65) Prior Publication Data
US 2021/0159847 A1    May 27, 2021

(51) Int. Cl.
*H02S 20/32* (2014.01)
*H02S 40/22* (2014.01)
(Continued)

(52) U.S. Cl.
CPC .............. *H02S 20/32* (2014.12); *F24S 23/74* (2018.05); *F24S 30/40* (2018.05); *F24S 50/20* (2018.05);
(Continued)

(58) Field of Classification Search
CPC ....... H01L 31/00–078; Y02E 10/50–60; H02S 10/30; H02S 20/00–32; H02S 40/20–22; H02S 40/40–44
(Continued)

(56) References Cited

U.S. PATENT DOCUMENTS

| 4,027,651 A | 6/1977 | Robbins, Jr. |
| 4,158,356 A | 6/1979 | Wininger |

(Continued)

FOREIGN PATENT DOCUMENTS

| EP | 0059690 A1 | 9/1982 |
| GR | 1003941 B | 7/2002 |

OTHER PUBLICATIONS

ISR for International Application PCT/ES2018/070303.
(Continued)

*Primary Examiner* — Bach T Dinh
(74) *Attorney, Agent, or Firm* — Ladas & Parry LLP

(57) ABSTRACT

The invention relates to a passive tracking device for tracking the position of the sun, which comprises a hollow parallelepiped casing through which the solar radiation entering through a first lens located at the upper end of the parallelepiped casing passes towards a discriminating reflector arranged at the lower end of the same casing; the tracking device redirects as much incoming radiation as possible towards side chambers for absorbing radiation, heating a working fluid contained in the side chamber; producing a volumetric expansion in the working fluid that, communicating with shafts for the rotation of the tracking device, allows the orientation with the normal/perpendicular position with respect to the position of the sun, and to guide the alignment direction of other tracking devices for collecting (Continued)

energy in devices for collecting photovoltaic and/or thermal energy that are mechanically connected to the tracking device.

17 Claims, 8 Drawing Sheets

(51) Int. Cl.
| | |
|---|---|
| *F24S 23/74* | (2018.01) |
| *F24S 30/40* | (2018.01) |
| *F24S 50/20* | (2018.01) |
| *G02B 3/08* | (2006.01) |
| *G02B 19/00* | (2006.01) |
| *G05D 3/10* | (2006.01) |

(52) U.S. Cl.
CPC ........... *G02B 3/08* (2013.01); *G02B 19/0009* (2013.01); *G02B 19/0042* (2013.01); *G05D 3/105* (2013.01); *H02S 40/22* (2014.12)

(58) Field of Classification Search
USPC .................................................. 136/243–265
See application file for complete search history.

(56) References Cited

U.S. PATENT DOCUMENTS

| | | | |
|---|---|---|---|
| 4,159,710 A | 7/1979 | Prast | |
| 4,198,954 A | 4/1980 | Meijer | |
| 4,211,212 A | 7/1980 | Braun | |
| 4,275,712 A * | 6/1981 | Baer | F24S 50/20 353/3 |
| 4,306,541 A | 12/1981 | Morrison et al. | |
| 4,352,350 A | 10/1982 | Johnson | |
| 2007/0251569 A1 * | 11/2007 | Shan | H01L 31/0547 136/246 |
| 2010/0170502 A1 * | 7/2010 | Glynn | F24S 90/00 126/684 |
| 2011/0088687 A1 * | 4/2011 | Kuckelkorn | F24S 70/25 126/677 |
| 2011/0100354 A1 | 5/2011 | Feng et al. | |
| 2012/0305077 A1 * | 12/2012 | Arab | H01L 31/0543 136/259 |
| 2013/0327400 A1 | 12/2013 | Caselles Fornes | |

OTHER PUBLICATIONS

Written Opinion for International Application PCT/ES2018/070303.
International Search Report of Application No. PCT/ES2018/070303 dated Dec. 21, 2018.
Written Opinion of Application No. PCT/IB2020/062459 dated Dec. 21, 2018.
Extended European Search Report dated Mar. 9, 2021.
Chinese Search Report corresponding to counterpart application 201880092370.9 dated Dec. 16, 2021.
JP Notice of Reasons for Refusal 06122243045.pdf.
KR Notice of Non-Final Rejection and the cited document D1.pdf.
Chilean Search Report dated Aug. 9, 2021.
Chilean Examination Report dated Aug. 9, 2021.

* cited by examiner

US 11,431,287 B2

TRACKING DEVICE

RELATED APPLICATION

This application is an application under 35 U.S.C. 371 of International Application No. PCT/ES2018/070303 filed on 13 Apr. 2018, the disclosures of which are incorporated in their entirety by reference herein.

SUBJECT

This invention refers to a passive solar-position tracking device using concentrated solar radiation to guide the positioning of photovoltaic- and/or thermal-energy harnessing devices in real time in order to achieve a high level of solar energy utilisation.

STATE OF THE ART

It is known in the state of the art as a device for tracking the sun that works through motion cameras which are sensitive to solar rays, comprising a focus lens to concentrate and guide the sun's rays to an area common to the motion cameras.

The motion camera includes a liquid with a low boiling point or any liquid that expands when heated within the motion camera as a result of the energy of the sun's rays.

Solar rays pass through the focus lens to impact the common area if the solar alignment device is correctly aligned, or onto a motion camera if the device is out of the desired alignment with the sun. This causes the motion camera to be activated so that this results in a movement of the solar-ray collector in a desired direction.

The motion camera includes a displacer connected in an actionable way to a stationary frame so that an increase in pressure in the motion camera results in a force exerted on the displacer to propel the solar tracking device against the frame.

The high concentration of solar radiation on a common area of the solar tracking device has the disadvantage that the radiation source generates a small, very hot, localised area through concentration of the solar radiation, which is not capable of transmitting the generated heat quickly, homogeneously, widely and efficiently to all the motion cameras where the volumetric expansion of the contained working fluid occurs. Therefore, there are delays in activating the displacer that drives the tracking device while the sun is moving, resulting in delayed tracking of the sun's position and thus reducing the yield of the high solar concentration.

The delay in the movement of the tracking device is a consequence of inefficient expansion of the working fluid contained within the motion cameras. This is due to the fact that there are strong temperature gradients within the motion cameras and, therefore, the amount of heated fluid volume is not maximised. Consequently, there is no rapid volumetric increase in the working fluid.

One disadvantage of tracking devices is that they require external elements to orientate themselves when the solar radiation penetrates the tracking device at large angles to the normal/perpendicular position of the device. For example, during sunrise and sunset, when the position of the sun is very low, the levels of radiation hitting the focusing lens are very low and insufficient to trigger the solar alignment device.

SUMMARY

This invention seeks to solve one or more of the described problems by means of a passive solar-position tracking device using concentrated solar radiation as defined in the claims.

The passive solar-position tracking device using concentrated solar radiation comprises a hollow parallelepiped housing which is penetrated by the incoming solar radiation and concentrated by a primary focusing lens arranged at the upper end on a discriminating reflector which is arranged at the lower end of the same housing. This reflects the incoming solar radiation at different angles onto at least one radiation-absorbing side chamber, when the parallelepiped housing is perfectly aligned and/or misaligned with the sun's position.

The parallelepiped housing also comprises a multitude of reflecting side surfaces of such geometry that they reflect the incoming solar radiation into the housing at different angles onto at least one radiation-absorbing side chamber, so that whatever the angle of entry of the solar radiation, it will be guided by reflection into at least one absorbing side chamber.

When the solar position is close to perfect alignment with the normal/perpendicular solar position of the tracking device, the concentrated incoming solar radiation strikes the discriminating reflector which reflects the concentrated solar radiation to a primary absorbing side chamber or to a second absorbing side chamber opposite the primary side chamber.

The discriminating reflector comprises a multitude of abrupt arched profiles adjacent to each other so that small changes in the position of the focus of the incoming solar radiation concentrated by the primary lens are reflected into one of the absorbing side chambers.

The parallelepiped housing has an inverted frusto-conical parallelepiped type shape. This is where the arched reflective inclined side surfaces are of the curved-concave reflective side surface type and where at least two opposing side surfaces have a lower section adjacent to the lower end, with a Fresnel-type profile and an upper section adjacent to the upper end has a lateral lens of the linear-lens type.

Also, at least two opposing side surfaces have a lower section adjacent to the lower end with a Fresnel-type profile and an upper section adjacent to the upper end, where an actuator piston is located.

The primary focusing lens of the Fresnel-lens type has a flat lower Fresnel outer profile that concentrates solar radiation on a focal point or line near to the discriminating reflector; this comprises at least two arched reflective surfaces, each with an inverted V-shaped cross-section to project the concentrated incoming solar radiation onto one of the absorbing side chambers arranged in parallel with and close to the inclined reflective side surfaces of the parallelepiped housing.

The discriminating reflector of the radiation source can be an aspherical lens, a parabolic revolving mirror, a Fresnel zone plate or similar, and the reflecting surface of the discriminating reflector has a flat arched cross-section of the concave plane, parabolic plane, elliptical plane or similar.

Additionally, the discriminating reflector of the radiation source comprises a through-slot that is penetrated by all the concentrated incoming solar radiation when the parallelepiped housing is perfectly oriented to the sun's position. Consequently, no part of the concentrated incoming solar radiation is reflected to any absorbing side chamber.

The physical dimensions of the through-slot predetermine which portion of the concentrated incoming solar radiation is reflected towards the target absorbing side chamber. Therefore, the tracking device is able to automatically maintain the alignment with the sun's position.

In addition, a lower thermal or photovoltaic receiver can be arranged beneath the through-slot to produce thermal energy or electrical energy, respectively, by harnessing the proportion of concentrated incoming solar radiation that is not reflected towards the absorbing side chambers, i.e. the proportion of concentrated incoming solar radiation not required to produce a rotational movement of the tracking device to maintain alignment with the sun's position.

The radiation-absorbing side chamber contains a working fluid whose volume increases according to the absorption of the incoming solar radiation. This leads to an increase in the temperature and pressure of the working fluid which is transmitted to at least one actuator piston positioned on the rotary axes of the parallelepiped housing.

The actuator pistons are placed close to the centre of gravity and connected to the rotary axes of the parallelepiped housing comprising fixed and rotatable tools to allow rotational movement of the solar-position tracking device.

The actuator piston consists of a rotating element connected by flexible tubes to the corresponding radiation-absorbing side chambers, adapted to transmit the pressure increase from the same absorbing side chambers to the rotating element.

The actuator piston further comprises at least two flexible membranes arranged at at opposite ends of the actuator piston to exert a smooth, progressive and precise thrust through the folding and unfolding of the same membranes.

The tilting movement, from east to west and vice versa and from north to south and vice versa, carried out by the solar-position tracking device is transmitted by means of mechanical movement transmission components such as rods and/or cables to at least one other tracking device in which the tracking movement of the first tracking device is induced.

The second tracking device comprises at least one thermal or photovoltaic receiver to produce thermal or electrical energy, respectively, by harnessing the incoming solar radiation concentrated by a focusing lens.

The solar-position tracking device automatically performs fast, precise and powerful passive solar position tracking by precisely distinguishing the incoming solar radiation concentrated on a small focal area, so that small alignment errors with the sun's position produce large and powerful energy changes in at least one absorbing side chamber or the opposite. The absorbing side chambers are radiated in a much more dispersed way to achieve rapid and homogeneous temperature increases in a larger area of the absorbing side chamber, and do not require the thermal energy to be transmitted by conduction through the side surfaces of the chambers or through the working fluid. All this creates a precise and powerful solar-position tracking device suitable for use in high solar concentration.

BRIEF DESCRIPTION OF FIGURES

A more detailed explanation is given in the following description which is based on the attached figures.

DESCRIPTION

Figure 1:
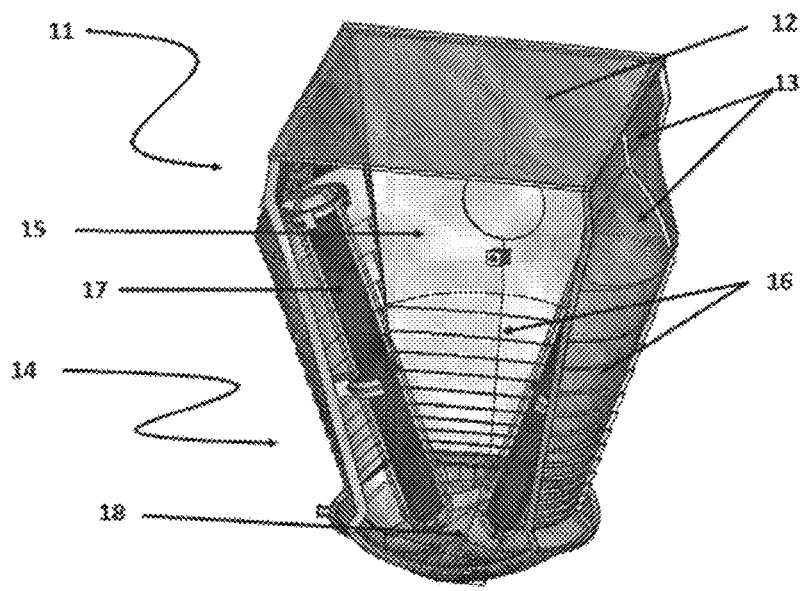
FIG. 1 shows a perspective view of a cross-section of a passive solar-position tracking device using concentrated solar radiation.
Figure 2:
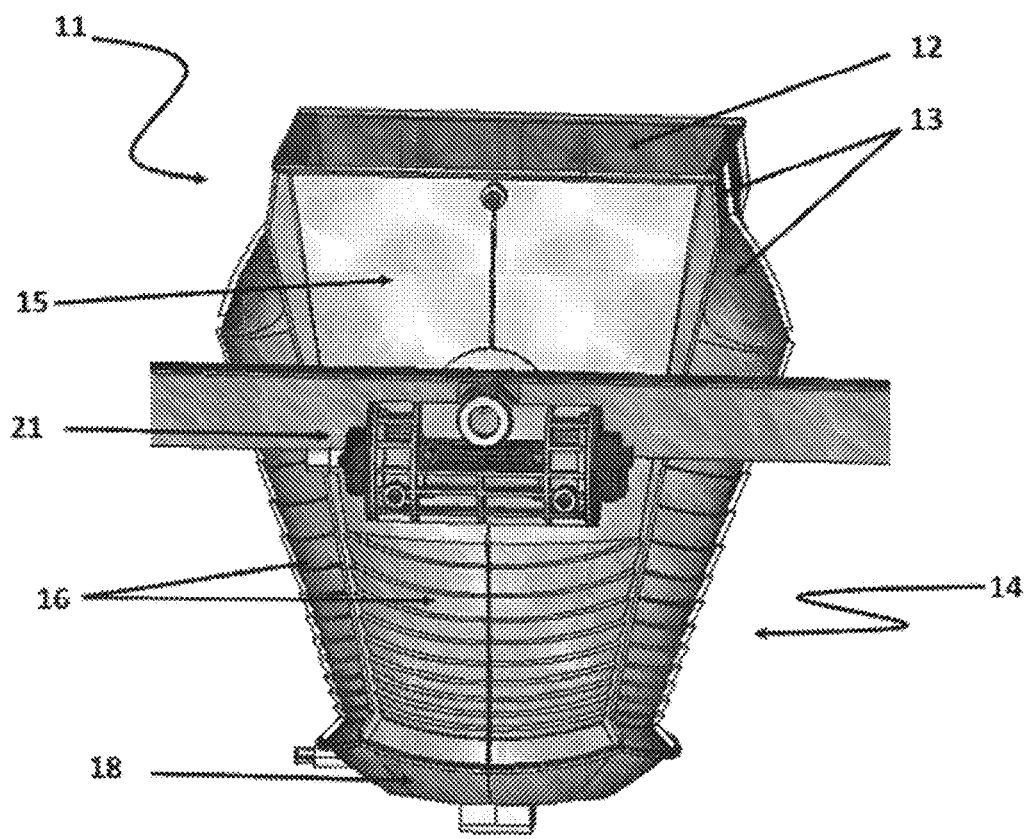
FIG. 2 shows a rear perspective view of the passive solar-position tracking device using concentrated solar radiation.
Figure 3:
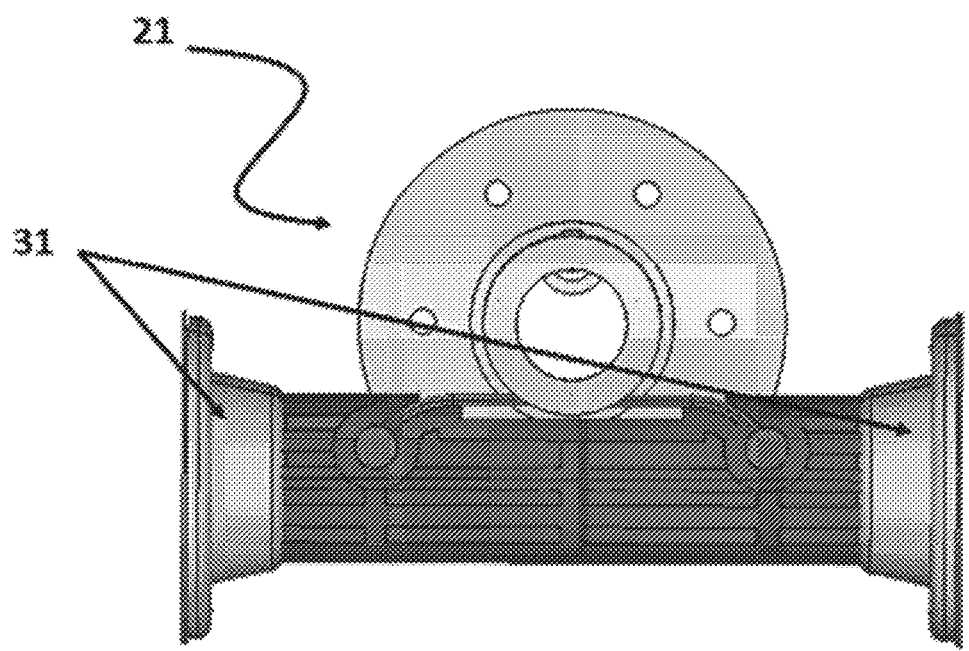
FIG. 3 shows an overhead view of an actuator piston of the passive solar-tracking device using concentrated solar radiation.
Figure 4:
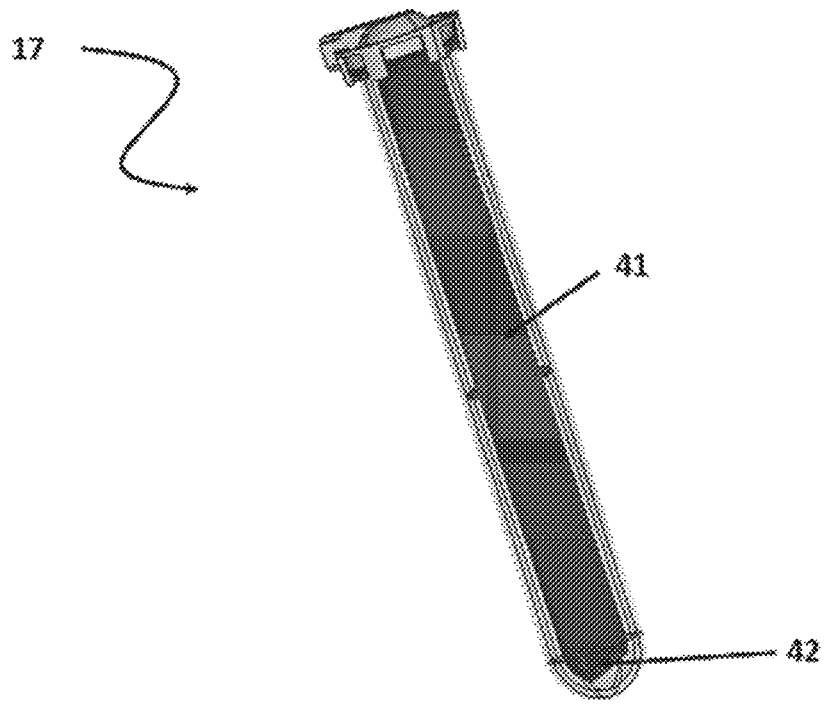
FIG. 4 shows an overhead view of a radiation-absorbing side chamber of the passive solar tracking device using concentrated solar radiation.
Figure 5:
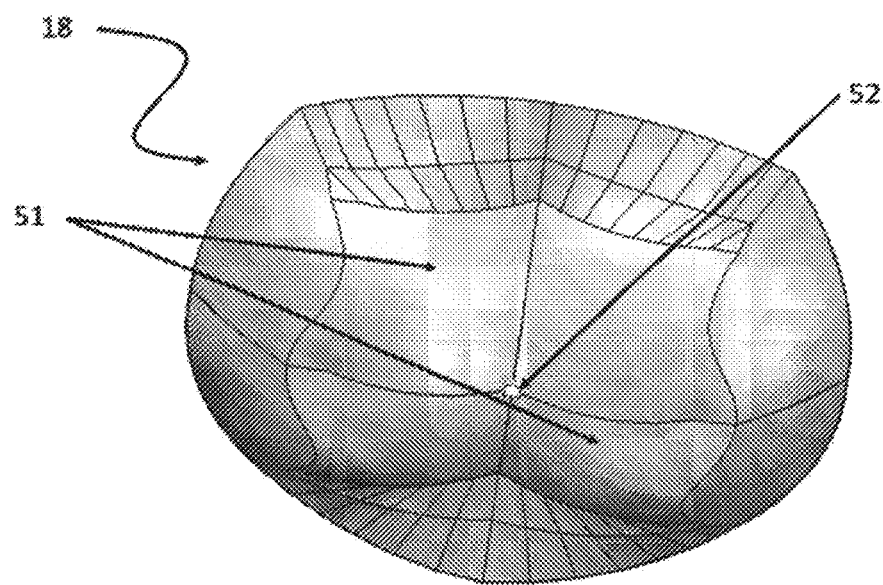
FIG. 5 shows a plan view of a discriminating reflector of the passive solar-position tracking device using concentrated solar radiation.

With reference to FIGS. 1, 2 and 3, in which a concentrated solar thermal-energy tracking device 11 is shown to target solar radiation at a predetermined location of the device and guide the alignment direction of a Photovoltaic- and/or thermal-energy arrangement.

The passive solar-position tracking device 11 is configured to redirect the maximum incoming radiation in a fast and precise manner to radiation-absorbing side chambers 17 in order to heat working fluid contained in the same side chamber 17 and thus produce a volumetric expansion in the working fluid that is transferred to some rotary axes of the tracking device 11 that allows automatic orientation, in real time, of the tracking device 11 with the normal/perpendicular position with respect to the position of the sun, and to guide the alignment direction of other tracking devices so that the energy is exploited in a highly concentrated way by photovoltaic- and/or thermal-energy harvesting devices mechanically connected to the passive tracking device 11 tractor and position marker, thereby obtaining the harnessing of the maximum solar radiation in a very concentrated way.

The passive solar-position tracking device 11 and solar concentrator comprises a hollow parallelepiped housing 14 which is penetrated by the incoming solar radiation through the primary concentrator lens 12 located at the upper end of the parallelepiped housing 14 into a discriminating reflector 18 positioned at the lower end of the same housing 14, when the sun's position is close to the normal/perpendicular position of the tracking device 11.

The parallelepiped casing 14 has an inverted frusto-conical parallelepiped type shape. It comprises a multitude of arched reflective side surfaces 16 of the curved-concave reflective side surface type to reflect the solar radiation onto the absorbing side chambers when the sun's position is far from perfect alignment with the normal/perpendicular position of the tracking device 11.

The tracking device 11 is mechanically coupled to an actuator piston 21 positioned near the centre of gravity of the parallelepiped housing 14 comprising fixed and rotatable tools to allow a rotational movement without displacement of the tracking device 11 from an initial position corresponding to sunrise and to an end position relative to sunset, and vice versa.

At least two opposite side surfaces 16 have a lower section adjacent to the lower end of the parallelepiped housing 14 with a Fresnel-type profile and an upper section adjacent to the upper end of the same parallelepiped housing 14 which has a lateral lens 13 of the linear lens type and which makes the incoming solar radiation linearly converge on the radiation-absorbing side chamber 17 opposite the corresponding lateral lens 13, when the sun is in a low position on the horizon at sunrise and sunset.

The lateral surfaces 16 are arranged facing respectively different opposite cardinal points, so that a primary surface 16 is positioned towards the eastern cardinal point and a second surface 16 is positioned towards the western cardinal point.

At least two opposing side surfaces 16 have a lower portion adjacent to the lower end with a Fresnel-type profile and an upper portion 15 adjacent to the upper end of the parallelepiped housing 14 where the actuator piston 21 is located. The side surfaces 16 are positioned facing opposite cardinal points respectively so that a third surface 16 is positioned towards the northern cardinal point and a fourth surface 16 is positioned towards the southern cardinal point.

The frusto-conical parallelepiped casing 14 comprises the primary lens 12 concentrator of the Fresnel-lens type, mechanically coupled to the upper end of the parallelepiped housing 14 to concentrate the solar radiation on a focal point located in proximity to or on the discriminating reflector 18 when the sun's position is close to the normal/perpendicular position of the primary lens.

The primary concentrator lens 12 has a flat upper and lower Fresnel profile that concentrates the solar radiation on the focal point of the discriminating reflector 18 when the sun's incident rays are perpendicular to the primary lens 12; on-axis condition.

With reference to FIGS. 5 to 10, the discriminating reflector 18 comprises at least two reflective surfaces 51, having, respectively, an arched, curved-concave or similar cross-section in an inverted V-shape that projects the concentrated solar radiation towards the corresponding radiation-absorbing side chamber 17.

The apex of the inverted arched V corresponds to the focal point of the primary concentrator 12 lens, if the sun's position is normal/perpendicular to the primary concentrator 12 lens. The reflective surfaces 51 of the discriminating reflector 18 respectively have an arched planar cross-section of the concave plane, parabolic plane, elliptical plane or similar.

The discriminating reflector 18 is an aspherical lens (not a Fresnel lens), a parabolic revolving mirror, a Fresnel zone plate or similar.

The solar-position tracking device 11 further comprises at least two radiation-absorbing side chambers 17 facing two by two which contain the working fluid of the liquid, gas or similar type. Therefore, depending on the variation in relative pressure inside the radiation-absorbing side chambers 17, the positioning of the tracking device 11 is automatically changed.

The pressure increase inside the radiation-absorbing side chambers 17 is transmitted through flexible tubes from the corresponding radiation-absorbing side chamber 17 to the actuator piston 21 so that it guides the rotational movement of the tracking device 11 in coordination with the position of the sun in real time.

In this way, a perfect synchronisation of the rotational movement east-west or north-south of the tracking device 11 is achieved so that it automatically orients itself according to the position of the sun.

The pressure of the absorbing side chamber on the western side 17 is inked to the eastern side of the east-west actuator piston, and with the increase of pressure in the eastern side of the actuator piston 21, it pushes the east-west actuator piston 21 to the west so that a rotating component of the actuator piston 21 rotates clockwise, causing the tracking device 11 to turn to the east.

Therefore, the pressure variation on the eastern or western side of the actuator piston 21 provides real-time tracking of the sun's position along the east-west axis.

Similarly, the same tracking mechanism occurs in the north-south seasonal movement, intervening in the north and south radiation-absorbing side chambers and the north-south actuator piston 21 in exactly the same way as the east-west actuator piston 21 described for the daily east-west movement.

Figure 11:
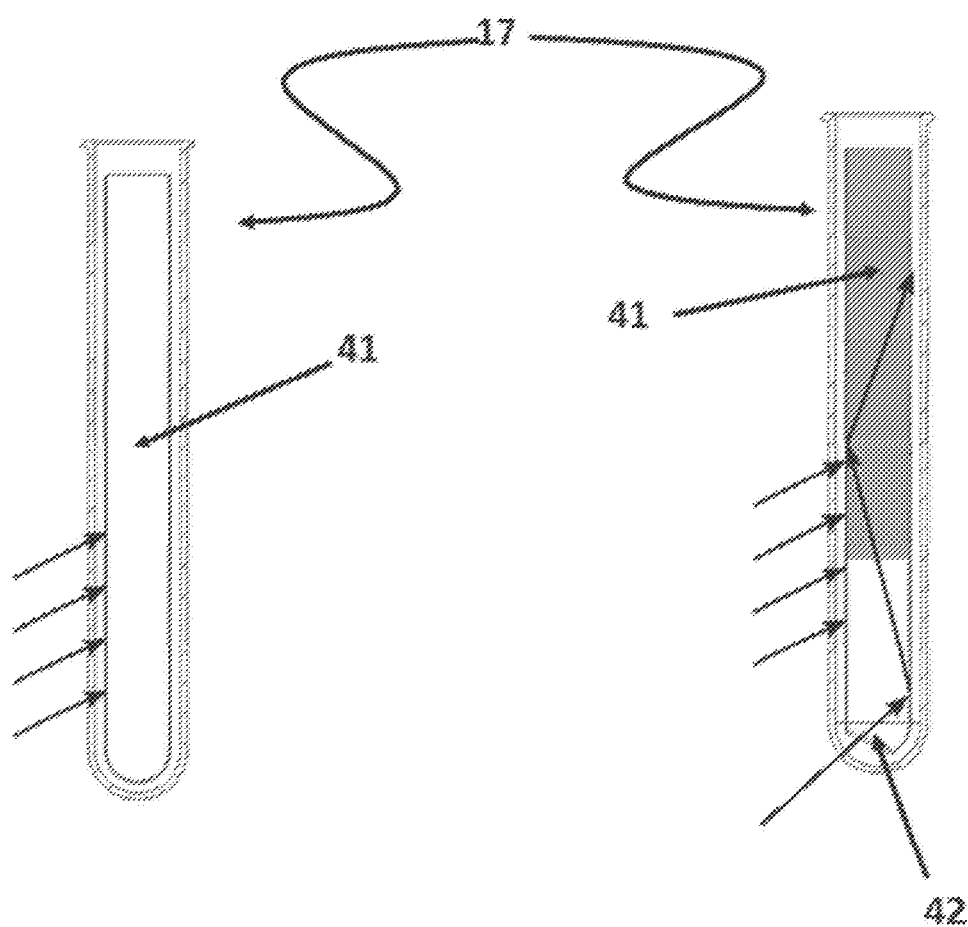
FIG. 11 shows an alternative overhead view of a radiation-absorbing side chamber of the passive solar-position tracking device using concentrated solar radiation.

With reference to FIGS. 3 and 11, the radiation-absorbing side chambers 17 are closed hollow bodies with an elongated tubular structure of the cylinder type which include pressure communication lines connected between the radiation-absorbing side chamber 17 and the corresponding actuator piston 21 comprising mechanical devices for converting a pressure increase into a rotary movement.

The radiation-absorbing side chamber 17 is mechanically coupled in a suspended and parallel manner to the corresponding arched reflective side surface 16. It is located between the reflection inclined side surface 16 and the symmetrical axis of the frusto-connical parallelepiped housing.

In turn, the working fluid is heated to high temperatures in order to increase the internal pressure of the radiation-absorbing side chamber 17 itself, by direct solar radiation and/or radiation reflected by the internal surfaces of the parallelepiped frusto-conical housing.

Consequently, the arched reflective inclined side surfaces 16 of the frusto-conical parallelepiped housing 14 reflect the received solar radiation towards the corresponding radiation-absorbing side chamber 17 arranged parallel to and at a predetermined distance from the arched reflective inclined side surface 16 to reflect the radiation. This impacts on the respective absorbing side chamber 17 causing it to heat up, and consequently causes a volumetric expansion by pressure that is transmitted towards the rotary axis of the tracking device 11, providing it with a rotational movement in real time, a function of the internal pressure of the radiation-absorbing side chambers 17 as they search for the most appropriate orientation according to the position of the sun.

The lateral tubular radiation-absorbing chambers are arranged in a cross on the east-west and north-south axes according to the cardinal points, and may be within the same tracking device 11 or in two tracking devices 11 where a first tracking device 11 performs the east-west movement and a second tracking device 11 performs the north-south movement of tracking the sun's position.

The radiation-absorbing side chamber 17 is made of glass or another transparent material adapted to contain the working fluid.

A thin concentric annular tube 41 is provided inside the radiation absorbing side chamber 1. The tube 41 is of a type of material such as metal which is darkened so that incoming solar radiation passes through the transparent wall of the side chamber 17 and is absorbed by the metal tube 41 which directly heats the working fluid.

The arrangement with glass or another transparent material may distinguish the wavelengths of solar radiation in order to provide a greenhouse effect and thus limit indoor-energy losses due to radiation.

Alternatively, the thin tube 41 features an oblique hole 42 arranged at the bottom end of the tube 41 facing the discriminating reflector 18 so that the radiation reflected by the same discriminating reflector 18 enters the thin tube 41 through the oblique hole 42 and thus produces heating in the inner part of the thin tube 41.

The thin tube 41 has an uncoated lower section with relatively high reflectivity, so that the solar radiation incident on the lower section is additionally reflected in a more scattered manner to an upper section of the same tube 41 in order to increase the diffusion of the solar radiation and produce a more homogeneous heating.

Figure 6:
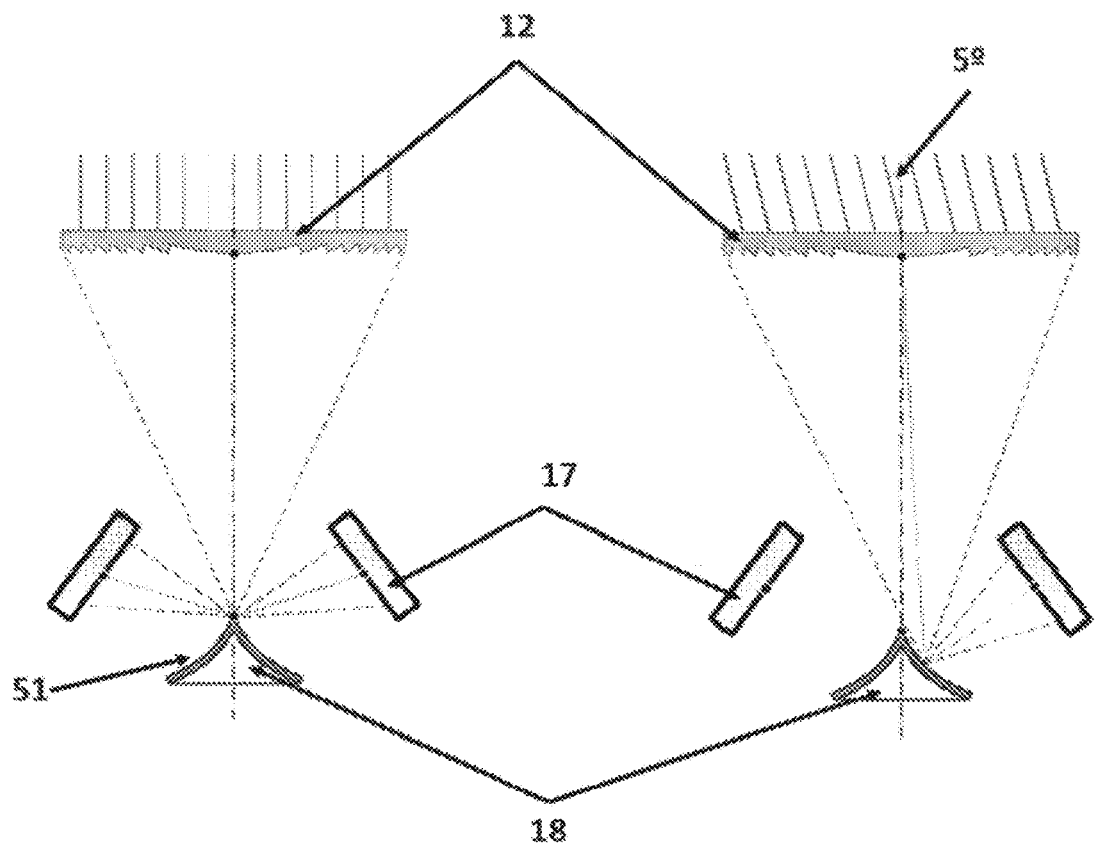
FIG. 6 shows a schematic overhead view of the passive solar-position tracking device using concentrated solar radiation in an on-axis condition and in an off-axis condition.
Figure 7:
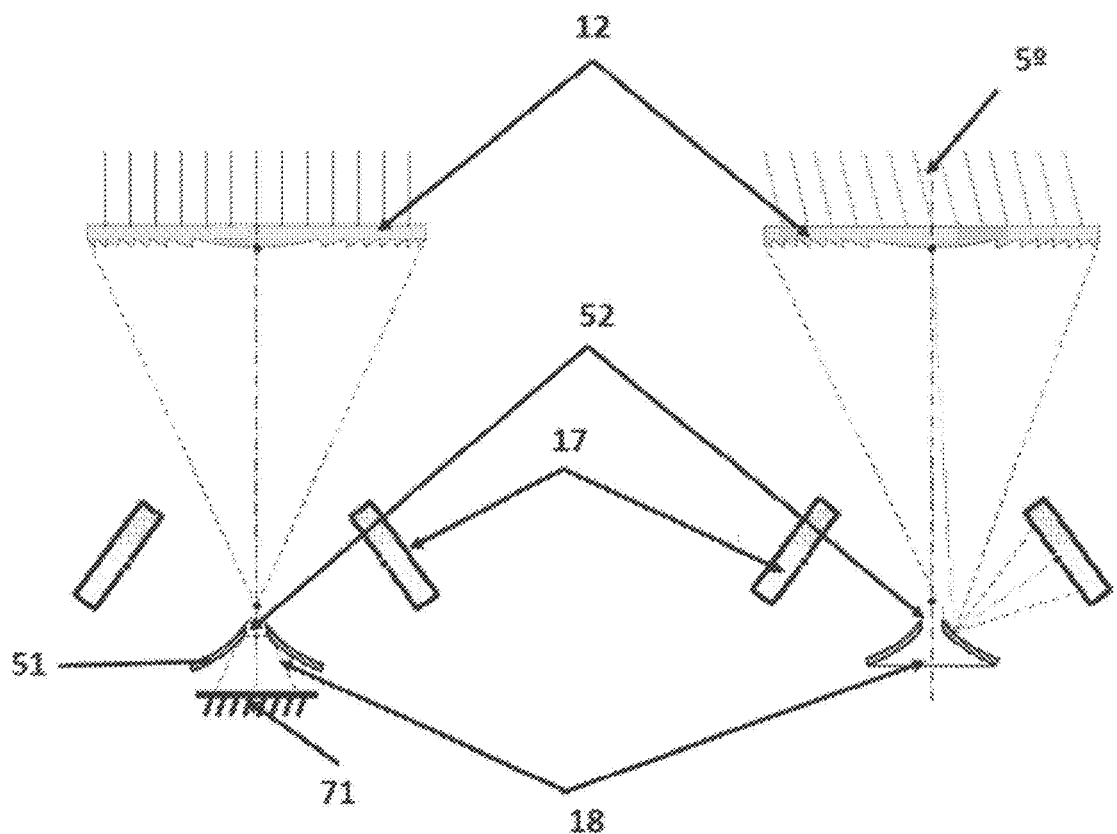
FIG. 7 shows a schematic overhead view of the through-slot of the discriminating reflector of the solar-position tracking device using concentrated solar radiation in the on-axis and off-axis condition.
Figure 8:
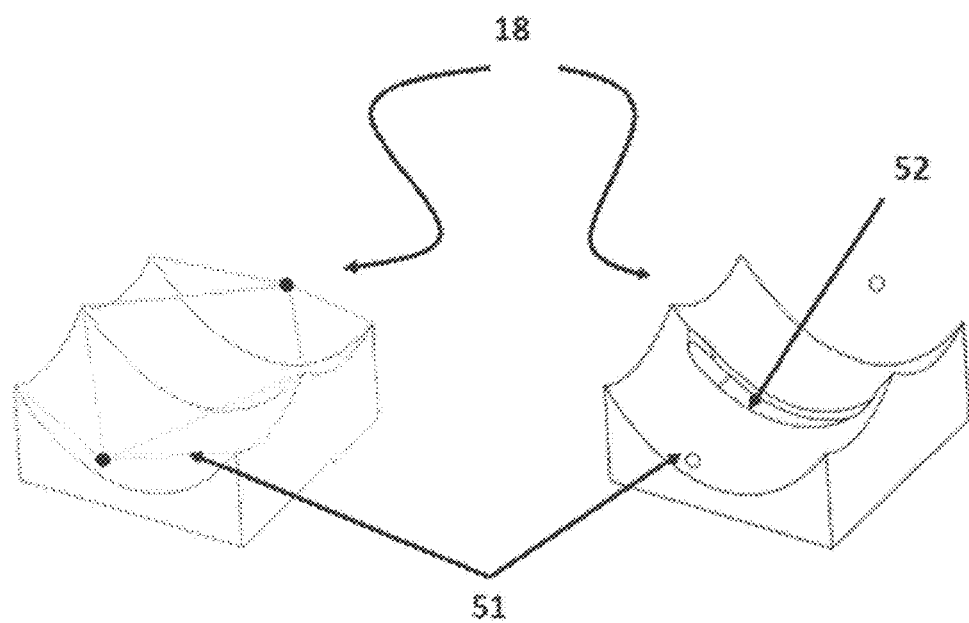
FIG. 8 shows a perspective view of some alternatives of the discriminating reflector without and with a through-slot.

With reference now to FIGS. 6 and 7, where the solar-position tracking device 11 is shown with different entry angles of direct solar radiation and details how the precise differentiation of the concentrated incoming solar radiation is produced in an on-axis condition and, therefore, the concentrated solar radiation falls on the focal point, the vertex of the discriminating reflector 18, reflecting the solar radiation on two radiation-absorbing side chambers 17 located in accordance with the eastern and western cardinal points respectively, an equal portion of the solar radiation is directed into either of the radiation-absorbing side chambers 17 positioned opposite one another.

However, the tracking device 11 may be misaligned with the sun in an off-axis condition such as in FIG. 6. Here, a misalignment is shown with an angle of 5° between the vertical and the position of the sun and, therefore, the focus of the concentrated incoming solar radiation is located on one of the reflecting surfaces 51 of the discriminating reflector 18, so that the aforementioned reflecting surface 51 directs all the concentrated incoming solar radiation to the corresponding radiation-absorbing side chamber 17. For example, the western radiation-absorbing side chamber 17 is operational and the eastern radiation-absorbing side chamber 17 is idle.

In short, as the sun moves, the radiation reflected to an absorbing side chamber 17 increases and the reflected radiation received by the opposite radiation-absorbing side chamber 17 decreases, as a result of the change in temperature of the radiation-absorbing side chambers 17. The change in the working fluid temperature takes place with very small changes in the position of the sun, which allows fast, accurate and powerful real-time tracking of the sun's position.

Alternatively, the discriminating reflector 18 has a through-slot 52 that allows some of the solar radiation to pass through the same slot 52 so that the remainder of the incoming solar radiation is directed into the corresponding absorbing side chamber 17 based on the sun's position.

Depending on the physical dimensions of the through-slot 52 and depending on the dimensions of the focal point or line generated by the primary upper lens 12, it is perfectly possible to regulate what percentage of energy is directed towards each radiation-absorbing side chamber 17 or penetrates the through-slot 52, thus regulating the behaviour and evolution of the rotational movement of the tracking device 11 during movement when tracking the sun's position.

The through-slot 52 takes on different shapes, e.g. an elongated shape arranged so that its smaller dimension, its width, is crossed by the focal point generated by the primary lens 12.

Below the through-slot 52, a lower receiver 71 of the lower thermal receiver type is provided to produce thermal energy when the tracking device 11 is in normal/perpendicular position with respect to the axis position; e.g. a liquid fluid circulating inside the lower thermal receiver 71 is heated to heat water for domestic water or another purpose.

Alternatively, a lower photovoltaic cell is positioned below the through-slot 52 to produce electrical energy.

The lower receiving radiation collector 71 receives the solar radiation that the discriminating reflector 18 does not reflect back into the absorbing side chambers 17.

Figure 9:
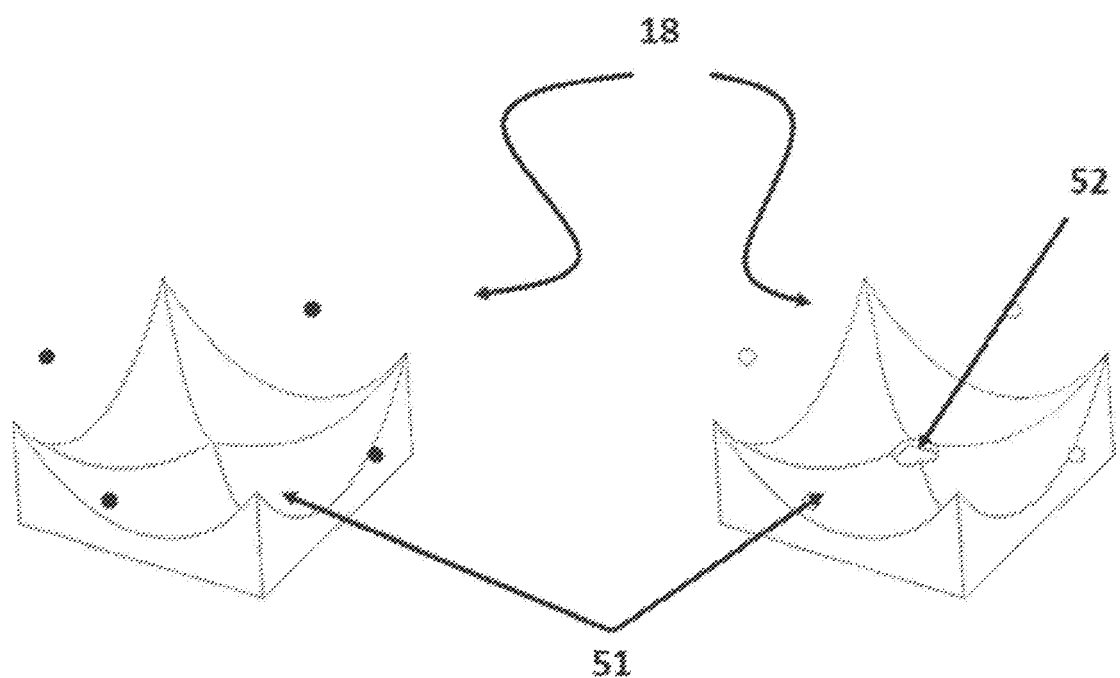
FIG. 9 shows a perspective view of additional alternatives of the discriminating reflector without and with a through-slot.
Figure 10:
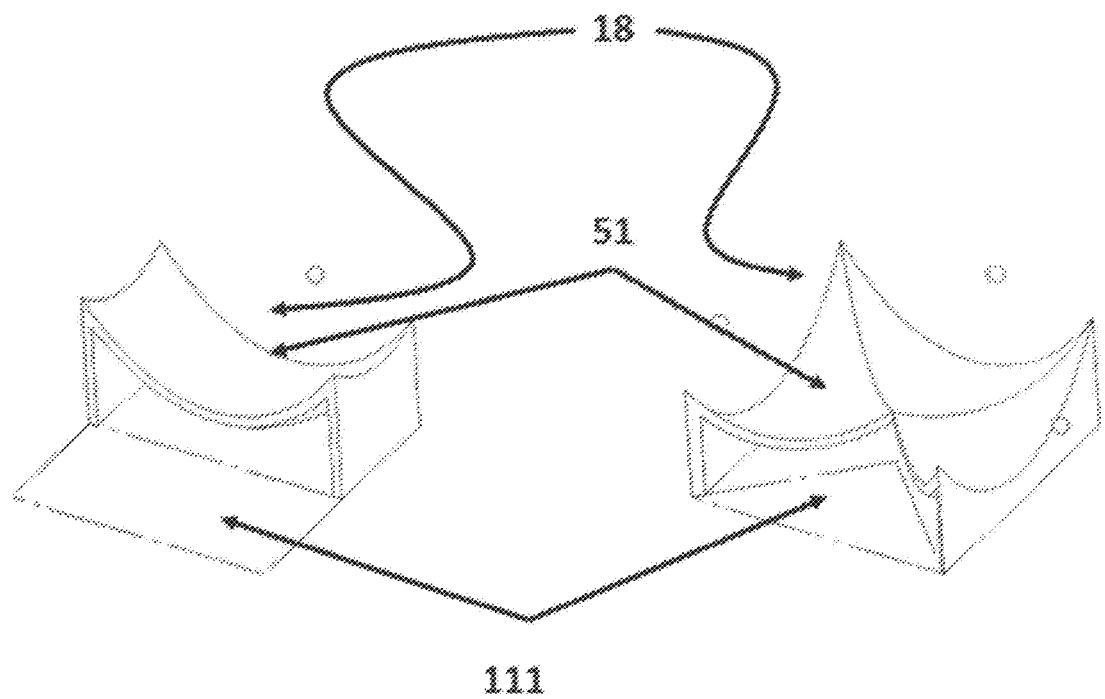
FIG. 10 shows a perspective view of additional alternatives of the discriminating reflector with the absence of a non-active reflective surface.

With reference now to FIGS. 9 and 10, the discriminating reflector 18 comprises four reflective surfaces 51 in the shape of an inverted arched V positioned in a cross, which projects the concentrated incoming solar radiation into one of the four radiation-absorbing side chambers 17 arranged in a cross within the parallelepiped housing 14 of a single tracking device 11, which can be rotated along the two east-west and north-south axes.

Therefore, the discriminating reflector 18 is divided into at least four curved reflecting surfaces 51 to direct the concentrated solar radiation to one of the four corresponding radiation-absorbing side chambers 17 in order to produce the expansion of the working fluid so that the pressure within two side chambers 17 increases and is transmitted to the corresponding ends of the actuating pistons 21 to trigger rotation along the two east-west and north-south axes.

The rotation along an axis occurs in either absorbing side chamber as a result of an increase in pressure and/or volumetric expansion of the working fluid i.e. in the east or west chamber, and in the north or south chamber.

The tracking device 11 is adapted to include a mechanism that provides a return force contrary to the rotational movement provided by an absorbing side chamber; the mechanism is a spring, counterweight, pressurised cylinder or similar type of component. Therefore, the discriminating reflector 18 exhibits the absence of a non-active reflective surface 111. In other words, the discriminating reflector 18 does not physically extend over the entire area of the lower end of the parallelepiped housing, which is a non-active part thereof.

Consequently, on the part of the discriminating reflector 18 that does not have a reflecting surface 111, a lower radiation collector with larger dimensions 71 can be arranged to transform the concentrated solar radiation into thermal or electrical energy for all the angles that correspond to this area.

Figure 12:
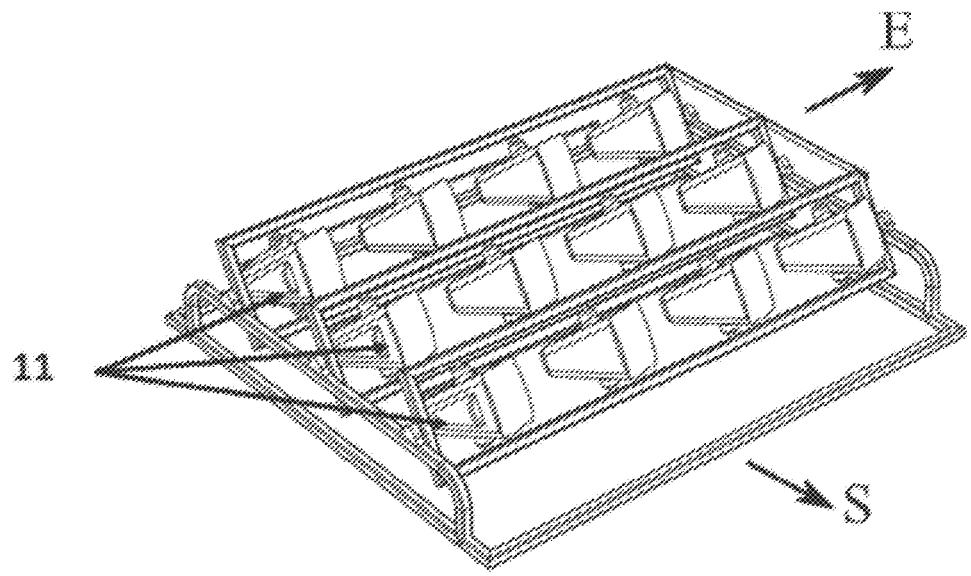
FIG. 12 shows a frontal perspective view of tracking devices arranged in a horizontal frame according to an east-west axis to guide the positioning of photovoltaic- and/or thermal-energy harnessing devices in real time.
Figure 13:
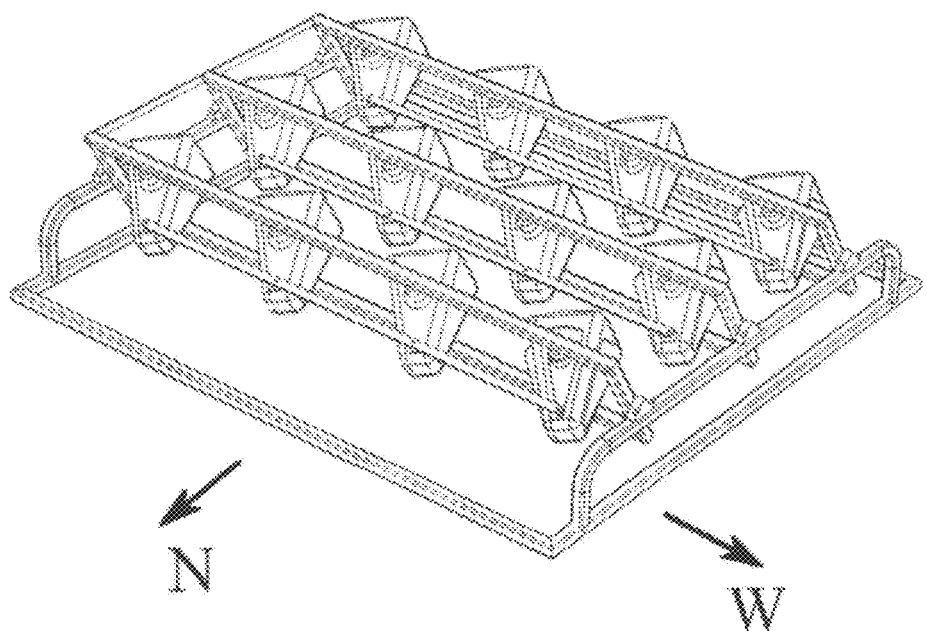
FIG. 13 shows a frontal perspective view of tracking devices arranged in a horizontal frame along an east-west axis to guide the positioning of photovoltaic- and/or thermal-energy harnessing devices in real time.
Figure 14:
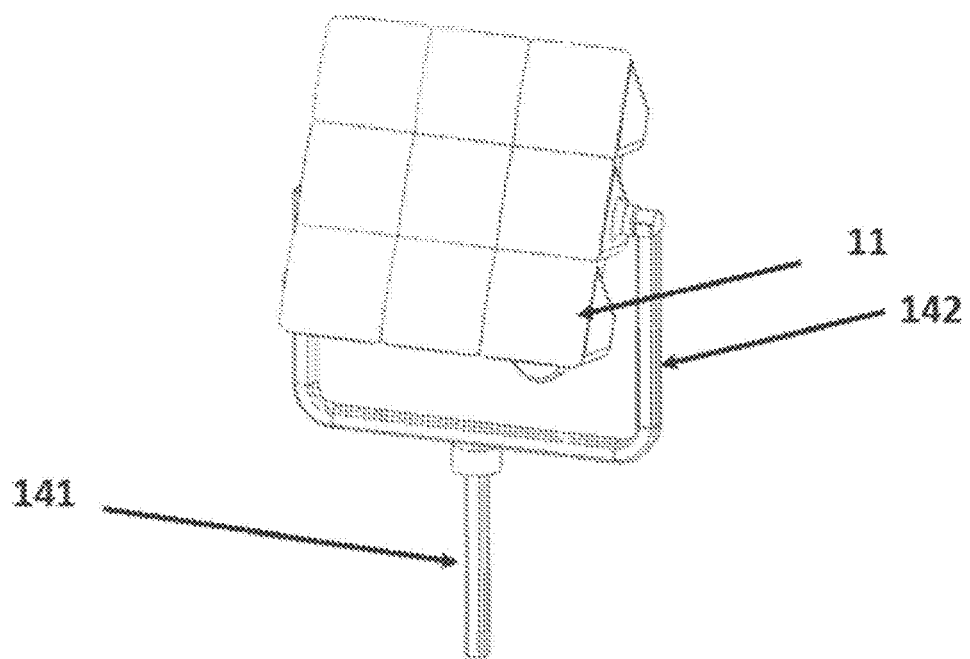
FIG. 14 shows a frontal perspective view of tracking devices arranged in a vertical frame to guide the positioning of photovoltaic- and/or thermal-energy harnessing devices in real time.
Figure 15:
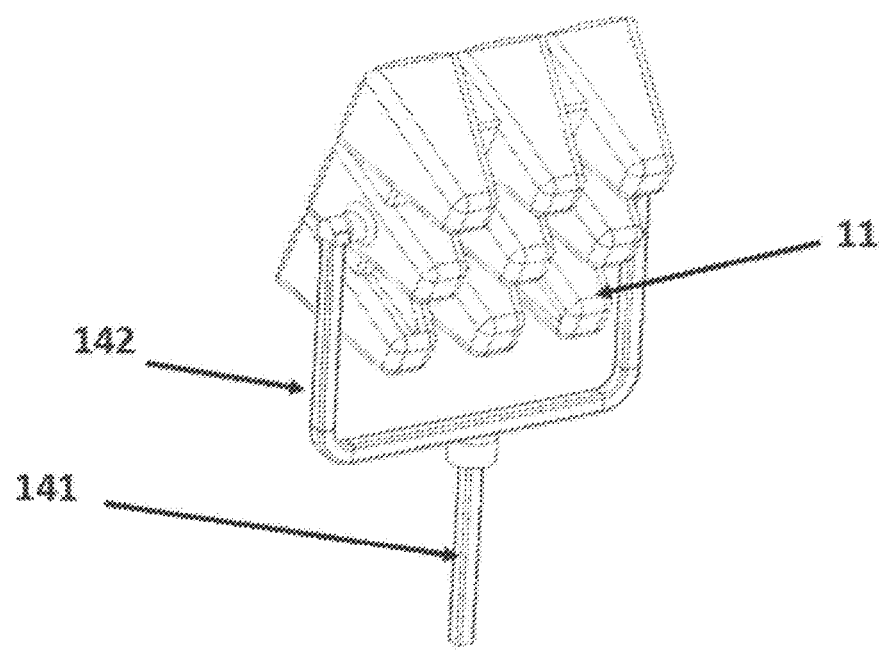
FIG. 15 shows a rear perspective view of tracking devices arranged in a vertical frame to guide the positioning of photovoltaic- and/or thermal-energy harnessing devices in real time.

With reference to FIGS. 12, 13, 14 and 15, a frontal perspective view shows the solar-position tracking device 11 that tracks the solar concentration which guides, in real time, the orientation of a multitude of devices for the use of photovoltaic and/or thermal energy. FIG. 13 shows a posterior perspective view of the same device and configuration.

FIGS. 12 and 13 show the directions according to the cardinal points, which assume that the system is mounted in the northern hemisphere. For use in the southern hemisphere, the assembly would be rotated 180° to point north.

A rigid vertical frame 141 is fixed to the floor and fitted with swivel joints that allow the assembly of a multitude of swivel frames 142 that rotate around the east-west axis.

Each 141 rotation frame is fitted with swivel joints that enable the installation of a number of tracking devices 11 which are traction units that guide the movement of tracking components for the use of photovoltaic and/or thermal energy.

A rigid bar mechanically couples several energy-collecting tracking components with the tracking device 11 so that they rotate simultaneously. In this way, the rotation of the tracking device 11 is automatically transferred to the energy-collecting components.

The operation of the two-axis tracking device 11 is similar, with the exception that it is connected to two rotating systems. The first axis causes a movement in the east-west direction with respect to the swivel frame, as in single-axis tractor units, and the second axis provides a rotation of the swivel frame in the north-south direction. All swivel frames are connected by mechanical joints that provide a rotation on both axes to the energy-collecting components.

FIG. 13 shows a rear perspective view of the solar-concentration tracking device 11, which guides the orientation of the photovoltaic- and/or thermal-energy arrangement where at least one concentration tracking device 11 is combined with a multitude of energy-collecting components arranged on a rotatable frame in such a way as to allow the arrangement to rotate in the direction of elevation so that the optical axes of the energy-harvesting components move closer or further away from the zenith.

The swivel frame is mounted on a fixed frame 141 such as a single post or pedestal, in such a way as to enable the swivel frame 142 to be rotated in the azimuth direction. A second mechanical tool is provided to cause this rotation.

Communication between the primary actuator piston 21 and the rotating component can be carried out by means of a cable generating a longitudinal rack on the primary actuator piston 21 that engages with a toothed circular pinion fitted to the rotating component.

With reference to FIG. 3, the flexible elastomer membranes or diaphragms 31 are arranged at the opposite ends of the actuator piston 21 in such a way that the pressure thrust on the actuator piston 21 occurs in a smooth, progressive and precise manner by folding and unfolding the membranes 31 and triggering the friction of the actuator piston 21 on the piston cylinder liner.

The concentrator tracking device 11 is arranged according to the four cardinal points that divide the horizon into equal parts, so that each side surface 16 of the parallelepiped 14 housing looks directly into a cardinal point so that the side surfaces 16 of the parallelepiped 14 housing can be identified as the north side surface, east side surface, south side surface and west side surface.

Consequently, a radiation absorbing side chamber 17 is respectively located close to the centre of the east, west, north and south inclined arched side surface 16.

The invention claimed is:

1. A solar-position tracking device comprises a hollow parallelepiped housing, at least two radiation-absorbing side chambers at least one of which is located on an opposite side of said hollow parallelepiped housing to at least one other such radiation absorbing side chamber, said chambers containing a working fluid, and a primary lens at the upper end of the hollow parallelepiped housing to concentrate the incoming solar radiation near the lower end of the hollow parallelepiped housing, wherein the radiation-absorbing side chambers are closed hollow bodies which include pressure communication lines connected between a radiation-absorbing side chamber and a corresponding actuator piston for converting a pressure increase into a rotary movement to rotate the hollow parallelepiped housing which has an inverted frusto-conical parallelepiped shape and comprises a plurality of curved-concave arched reflective side surfaces to reflect solar radiation onto the absorbing side chambers and a discriminating reflector arranged at the lower end of the hollow parallelepiped housing to reflect the incoming concentrated solar radiation to at least one radiation-absorbing side chamber when the hollow parallelepiped housing is in an aligned position with the sun.

2. The solar-position tracking device according to claim 1 wherein the radiation-absorbing side chambers have a closed hollow cylindrical type shape arranged parallel to and in proximity to a respective arched, reflective, inclined side surface.

3. The solar-position tracking device according to claim 2, wherein the radiation-absorbing side chamber is made of a transparent material that allows the solar radiation spectrum to pass through and prevents the emission of lower frequency wavelengths of radiation generated by the internal heat to provide a greenhouse effect inside.

4. The solar-position tracking device according to claim 2, wherein a radiation-selective absorber is placed inside the side chamber which absorbs radiation.

5. The solar-position tracking device according to claim 1, wherein at least two opposing side surfaces have a lower section with a Fresnel-type profile adjacent to the lower end of the same hollow parallelepiped housing and an upper section adjacent to the upper end of the same hollow parallelepiped housing has a linear lens type side lens for converging the incoming solar radiation linearly on the radiation absorbing side chamber opposite a corresponding lateral lens.

6. The solar-position tracking device according to claim 5 wherein the side lens concentrates the incoming solar radiation on the radiation-absorbing side chamber which is located near the side surface opposite the side lens.

7. The solar-position tracking device according to claim 1, wherein at least two opposing side surfaces (16) have a lower section with a Fresnel-type profile adjacent to the lower end of the same hollow parallelepiped housing, and an anchor centred on the tracking device's centre of gravity where actuator pistons are arranged and linked to rotary axes of the tracking device.

8. The solar-position tracking device according to claim 1, wherein the primary lens is a Fresnel lens with a flat upper profile and Fresnel lower profile to concentrate the solar radiation on a focal point or line close to the discriminating reflector.

9. The solar-position tracking device according to claim 1, wherein the discriminating reflector comprises at least two arched reflective surfaces with an inverted V-shaped cross-section to project the concentrated incoming solar radiation onto the radiation-absorbing side chambers.

10. The solar-position tracking device according to claim 9, wherein the discriminating reflector is an aspherical lens, a parabolic revolving mirror, or similar.

11. The solar-position tracking device according to claim 9, wherein the reflective surface of the discriminating reflector has an arched, curved-concave or similar cross-section in an inverted V-shape.

12. The solar-position tracking device according to claim 9, wherein the discriminating reflector comprises a through-slot below which is positioned a lower receiver for collecting radiation adapted to provide at least one of thermal energy and electrical energy.

13. The solar-position tracking device according to claim 7, wherein the actuator piston is placed close to the centre of gravity and connected to a rotary axis of the hollow parallelepiped housing, with the tracking device which allow a rotational movement without displacement of said tracking device while tracking the sun's optical path.

14. The solar-position tracking device according to claim 13, wherein the actuator piston is connected to the corresponding radiation-absorbing side chamber by means of flexible tubes in order to absorb the pressure increase produced inside the radiation-absorbing side chamber.

15. The solar-position tracking device according to claim 7, that wherein the actuator piston comprises flexible membranes or diaphragms arranged at opposite ends of the actuator piston to exert a thrust by folding or unfolding the same membranes or diaphragms.

16. The solar-position tracking device according to claim 7, wherein the actuator piston is arranged on the rotary axis of the tracking device to provide a rotation of the tracking device according to the east/west or north/south movement in accordance with the sun's position.

17. The solar-position tracking device according to claim 16, wherein the actuator piston respectively receives the volumetric expansion produced within the opposing radiation-absorbing side chambers, east/west or north/south, at the ends of the same actuator piston of the tracking device.

* * * * *